Figure 3:
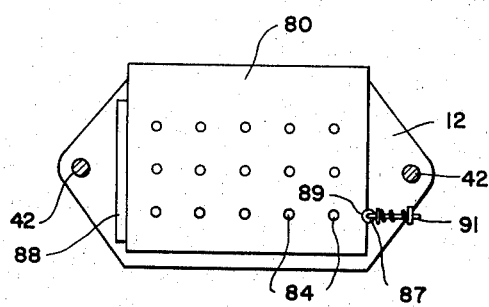

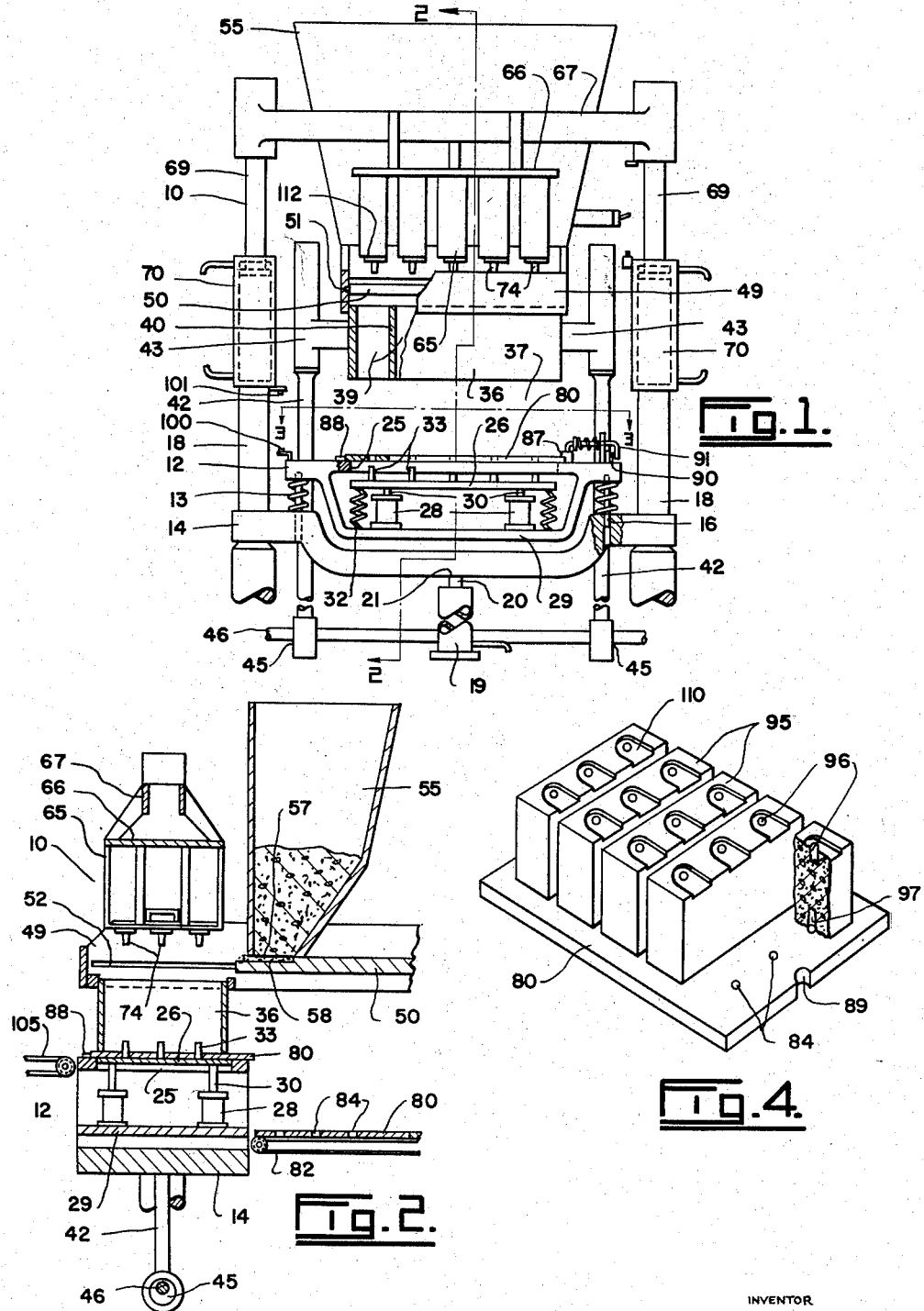

March 3, 1959

C. R. ROSS 2,875,499

BLOCK MAKING APPARATUS

Filed July 14, 1953

2 Sheets-Sheet 2

INVENTOR
CHARLES R. ROSS
BY
Fetherstonhaugh & Co.
ATTORNEYS

United States Patent Office 2,875,499
Patented Mar. 3, 1959

2,875,499

BLOCK MAKING APPARATUS

Charles R. Ross, Vancouver, British Columbia, Canada

Application July 14, 1953, Serial No. 367,940

6 Claims. (Cl. 25—41)

This invention relates to apparatus for making blocks from plastic material, such as concrete, having one or more holes in at least one edge thereof, and preferably in each of opposite edges thereof.

This application is a continuation in part of the applicant's application Serial Number 189,704, filed October 12, 1950, now abandoned as to subject matter common thereto.

The main object of this invention is to provide apparatus for forming molded concrete blocks of exact dimensions having one or more holes in one edge or in each of opposite edges, but the apparatus may be used for forming similar blocks from any plastic material which may be poured into a mold and which sets into a solid.

The apparatus according to this invention is particularly designed for forming holes in the edges of concrete building blocks. The blocks may be made one at a time, or they may be made in groups of two or more blocks. Blocks of this type are formed with one or more holes in each of two opposite edges thereof which are adapted to receive locking pins to hold the blocks together when they are placed one on top of another to form a wall. These blocks must be accurately constructed and the holes in the edges thereof have to be exact in size, free of any obstruction, and always in the same place relative to the sides and ends of the blocks. When making a concrete block, a pin is positioned in the bottom of a mold for each hole to be formed in one edge of the block. If one or more holes are to be formed in the opposite or top edge of the block, after the concrete is poured into the mold, a pin is inserted in the top thereof in line with each pin projecting into the bottom of the mold. Then pressure is applied to the top of the block to make it solid and to press it into a block of certain exact dimensions. After this has been done, the pin or pins are withdrawn from the block.

In the past, efforts to make blocks of this nature have not been entirely successful or the process has not been practical in a commercial way. The main difficulty was that the blocks had to be formed on their sides on pallet boards, and the holes formed in one edge or in opposite edges thereof. This meant that only one block at a time could be formed on a pallet board, and it was very difficult to press the concrete into a block having exact dimensions. It took practically as long to make one block in the old way as it does with the present apparatus to make several blocks at a time. The amount of handling and care was the same for a single block as it is with a plurality of blocks in this apparatus.

Apparatus according to this invention for forming one or more concrete blocks includes a pallet board element having at least one hole extending therethrough, there being a hole in the board element for each hole required in an edge of the block. While one block at a time may be made, it is preferable to make several blocks at once. Although it is possible to make blocks having only one hole in an edge thereof, and this is done, most blocks have several holes in them. A mold element which is open at the top and bottom rests on the board element, one of said elements being movable towards and away from the other. A lower pin is aligned with each board element hole, and suitable means for moving each pin into and out of the molded element through one of these holes. Concrete is poured into the mold element while the pin or pins are projecting thereinto. After the concrete has been poured, a header which slidably fits in the top of the mold is pressed against the material therein to form a contact block. If more than one block is formed at a time in the mold, the latter is divided into compartments by vertical partitions. If it is desired to form one or more holes in the top of each block, one or more upper pins project downwardly from the header in line with each lower pin so that the upper pins are pressed into the concrete material as the header moves downwardly. When the pallet board element and the mold element are separated, the molded block or blocks rest on the board element and may be transported thereon.

Figure 5:
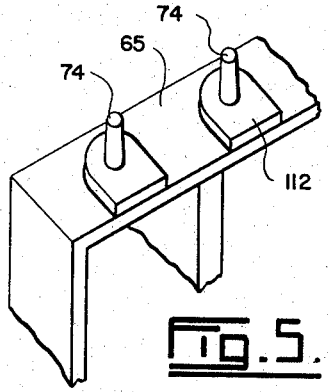
Figure 6:
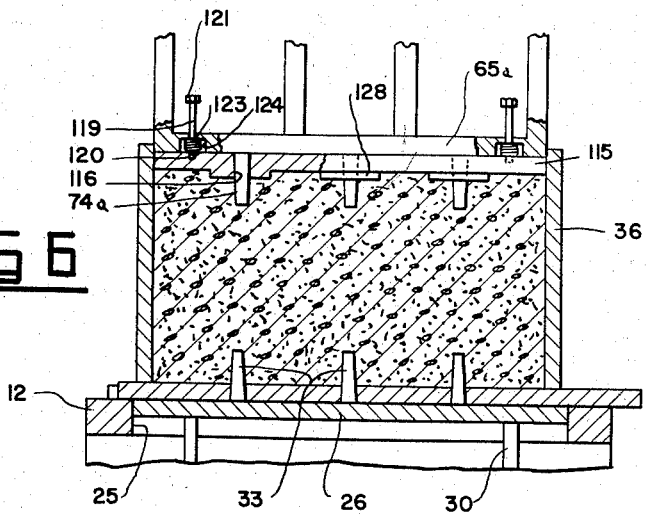
Figure 7:
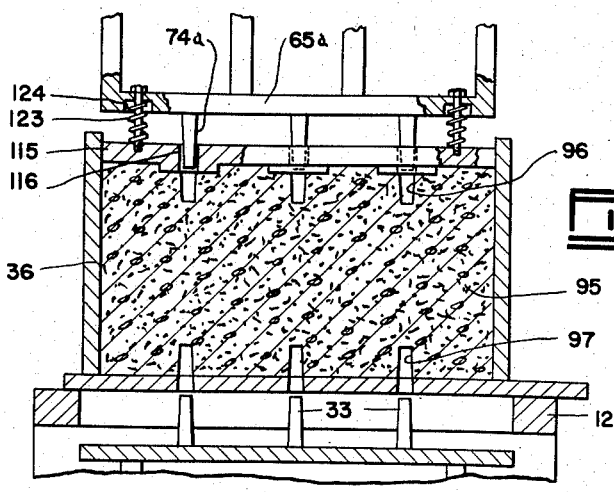

Examples of apparatus for making several blocks at a time, each having a plurality of holes in each of opposite edges, are illustrated in the accompanying drawings, in which, Figure 1 is an end elevation, partly in section, of block making apparatus showing the elements thereof before the pallet board and mold are brought together, Figure 2 is a reduced vertical section taken on the line 2—2 of Figure 1, but with the pallet board and mold together ready to receive the plastic material, Figure 3 is a horizontal section taken substantially on line 3—3 of Figure 1, Figure 4 is a perspective view of a pallet board with several molded blocks thereon, one of these blocks being broken away to show the holes thereof in section, Figure 5 is an enlarged perspective view of a portion of a header which has been turned over to show the upper pins thereof, Figure 6 is an enlarged vertical section taken longitudinally through a mold with the concrete material therein and the header moved against the top thereof, and illustrating an alternative form of header, and Figure 7 is a view similar to Figure 6 with the header moved away from the concrete material sufficient to withdraw its pins therefrom.

Referring particularly to Figures 1 to 5 of the drawings, 10 generally designates one form of machine which may be used in making concrete blocks in accordance with this invention. This machine includes a table 12 resiliently carried by springs 13 extending between the table and a support 14. Guide pins 16 may project downwardly from the table and slidably extend through holes in the support to prevent relative side or end movement between these elements. In this example of the invention, the support 14 is moved up and down, and any suitable means may be provided for this apparatus. The opposite edges of the support are slidable on vertical guides 18, and a hydraulic cylinder 19 is provided having a ram 20 projecting therefrom, the upper end of which is connected to the support at 21.

The table 12 has a large opening 25 therein, and a header plate 26 is positioned below the table and in line with this opening. The header plate is adapted to be moved upwardly into and downwardly out of this opening in any convenient manner. In this example, a plurality of solenoids 28 are provided, said solenoids being carried by a bracket 29 suspended from the bottom of the table. Each solenoid has a core 30 projecting upwardly therefrom, the outer end of which is connected to the header plate. When the solenoids 28 are energized, the plate is moved upwardly into the table opening 25, and when they are de-energized, the plate drops back down out of the opening. If desired, one or more springs 32 may be provided for drawing the plate downwardly.

One or more lower pins 33 project upwardly from the header plate 26. Each pin is preferably, although not necessarily tapered, that is, its outer end is slightly smaller than its inner end.

A mold element 36 is provided in the machine above the table 12. When this table is in its lowermost position, the space 37 between it and the mold is greater than the height of the blocks to be formed. The illustrated mold is used in the formation of several blocks at a time so that it is divided into a plurality of compartments 39 extending longitudinally thereby partitions 40.

If desired, suitable means may be provided for vibrating the mold element 36 during the formation of the blocks. In this example, vertical rods 42 are connected to opposite sides of the mold by webs 43, and the lower ends of these rods ride on eccentric cams 45 which are fixedly connected to a shaft 46, said shaft being rotated by a suitable source of power, not shown.

Concrete or other suitable plastic material may be poured into the top of the mold 36 in any convenient way. One way of doing this is to provide a large collar 49 surrounding the upper end of the mold and in which a horizontal plate 50 is slidably mounted. This plate may be provided with tongues 51 in its opposite edges which slide in slots 52 in the inner surface of the collar 49. Suitable means, not shown, is provided for reciprocating the plate towards and away from the mold. This plate forms the bottom of a hopper 55 located above and to one side of the mold 36, see Figure 2. The hopper has a discharge opening 57 at the lower end thereof, while the plate has a recess 58 in its upper surface which is substantially the same size as this opening. When the plate is drawn outwardly from the mold, concrete fills the recess 58 therein, and when the plate is moved in the opposite direction over the mold, this concrete is discharged into the mold. The upper surface of the plate closes off the discharge opening of the hopper at this time. In this way, a given amount of concrete is directed into the mold each time the plate moves towards the latter.

A header 65 is provided above and in line with each compartment 39 of the mold 36. Each header is exactly the same size and shape as the inner cross sectional shape of its mold compartment so that the former may slidably fit into the latter. In the illustrated example, there are several of these headers and they depend from a support 66 which, in turn, is carried by a transverse beam 67, the opposite ends of which are supported by piston rods 69 projecting from the upper ends of hydraulic cylinders 70 mounted on the tops of the guides 18. When the beam 67 is in its uppermost position, the headers 65 are positioned above the mold 36 sufficiently to allow the plate 50 of the concrete fitting mechanism to move therebetween, see Figures 1 and 2.

Each header 65 is provided with downwardly projecting upper pins 74 which preferably, although not necessarily, are tapered, that is, their outer ends are smaller than their inner ends. There is a pin 74 in line with each lower pin 33 of the header plate 26.

It may be stated here that the pins 74 of each header 65 are equally spaced from each other, and the spaces between the pins adjacent each end thereof and said ends are equal to one-half the distance between two pins. Similarly, the distance between the centre of each pin and each side of the header is equal to one-half the distance between the centres of two pins. These pins extend longitudinally of the mold compartment 39 therebeneath. In this example, there are three pins 74 above each mold compartment and, consequently, there are three pins 33 on the header plate 26 beneath each mold compartment. The spacing of the lower pins 33 relative to each other and the sides and ends of the mold compartment are the same as that of the upper pins 74.

In order to enable the apparatus described so far to function properly, a pallet board element 80 is required. This board element is placed on the table 12 over the opening 25 therein. In actual practice, there are a plurality of these pallet boards for each machine, and they are fed into it in any desired manner. In this example, an endless feed belt 82 is provided near the table 12 and the upper surface of this belt is in line with the upper surface of the table when the latter is in its lowermost position. Suitable means, not shown, is used for driving the belt when required. When the belt is moving, a pallet board is moved towards and on to the table, and the next pallet in line moves the first one on the table over the opening therein. At a certain time, the belt is stopped, and this takes place before the next pallet reaches the table, see Figure 2.

Each pallet board 80 is provided with a plurality of holes 84 extending therethrough, there being one hole for each hole to be required in the block or blocks to be formed thereon. In this example, there are three holes 84 beneath each mold compartment 39 when the pallet board is in position on the table 12.

It is obvious that the holes 84 of each pallet board should be positioned over the lower pins 33 beneath the surface of the table. One way to be sure that this takes place is to provide a spring loaded roller 87 at the surface of the table 12 adjacent one side thereof. This roller bears against the side of a pallet board 80 as it is being moved into position over the table top, and it presses the pallet against a guide strip 88 located at the opposite side of the table. Each board is formed with a notch 89 in the side thereof against which the roller bears substantially midway between the opposite ends of the board. When the roller is pressed into this notch, it holds the board in the correct position with the holes 84 directly over the lower pins 33. When the roller moves into this notch, the supply belt 82 is stopped. Switch contacts 90 are shown at the outer end of the rod 91 which carries roller 87. This is an example of one way of stopping the belt 82. When the roller enters a pallet board notch, these contacts are closed to close an electrical circuit which either stops a motor driving the belt or causes a clutch to be disengaged to stop the belt. As the belt driving mechanism and the actual control of it does not form part of the invention, it is not described and illustrated herein. This applies to all the controls for the machine 10.

As the operation of the machine is described, control switches will be included for starting and stopping the various operations, but it is to be understood that electrical, hydraulic or other controls may be used.

Figure 4 illustrates a plurality of molded blocks 95 on a pallet board 80. Each of these blocks has three holes 96 formed in its upper edge, and three holes 97 in its lower edge.

The operation of the machine 10 is as follows: at the start of a cycle, the table 12 is in its lowermost position, and the headers 65 are in their uppermost positions. A pallet board 80 is moved on to the table and when the roller 87 moves into the notch 89 in the side of the board, the latter is stopped, and the roller pressing it against the guide strip 88, retains the board in its proper position relative to the lower pins 33 therebeneath. If desired, the switch contacts 90 may also start suitable pump mechanism, not shown, for directing fluid into the hydraulic cylinder 19 to move the support 14 and the table 12 upwardly until the pallet board thereon is pressed against the bottom of the mold 36. The springs 13 may be compressed a little at this time in order to be sure that the board is firmly pressed against the mold. If desired, switch contacts 100 and 101 may come together when the table reaches its uppermost position to stop the mechanism supplying fluid to the cylinder 10. As the table moves upwardly, or just after it reaches its uppermost position, the solenoids 28 are energized to move the header 26 into the table opening 25, at which time the lower pins 33 move through the pallet board holes 84, see Figure 2. The switch contacts 100 and 101 may also start the mechanism which reciprocates the feed plate 50, and also the mechanism for rotating shaft 46. The cams 45 and rods 42 vibrate the mold and the pallet board while the plate 50 feeds concrete into the mold. When a predetermined amount of concrete has been fed into the mold, the plate 50 and the vibration are stopped. The vibration ensures the concrete being firmly packed in and evenly distributed throughout the mold compartments 39. The spring mounting of the table 12 permits this vibration of the mold without damaging the machine. As soon as the feed plate stops moving, fluid is supplied to the upper ends of cylinders 70 to move the rods 69 downwardly, moving the headers 65 in the same direction. These headers are moved downwardly a predetermined distance each time so that the concrete in the mold is subjected to a very high pressure and is compressed to a predetermined size. As the headers 65 move downwardly, the pins 74 are moved into the concrete to form the holes in the upper edges of the blocks. As the material is poured into the mold, the lower holes are formed in the blocks by the pins 33.

After the block has been compressed and formed in this manner, the table 12 and the headers 65 move downwardly together to withdraw the molded blocks 95 from the mold compartments. When the table reaches its lowermost position, pins 33 are withdrawn from the pallet board, and the latter is removed from the machine. This may be done by starting up the belt 82 and allowing the next pallet thereon to move the pallet in the machine out on to a receiving conveyor 105. When the headers have been drawn into their outermost position, the cycle has been completed.

If it is desired to form depressions 110 in the upper edges of the blocks, see Figure 4, it is only necessary to provide protuberances 112 on the lower surface of each header 65, as shown in Figure 5. As there is a depression 110 at each of the upper block holes 96, it is necessary to provide a protuberance 112 at each of the upper pins 74. The shape and size of these protuberances depends upon the shape and size required for the block depressions.

In Figures 6 and 7, each upper header 65a has a plate 115 extending across the face thereof. This plate is exactly the same size and shape as the header so that it will slidably fit into a compartment 39 of the mold 36. The plate is also provided with a hole 116 extending therethrough for each upper pin 74a of the header. When the plate is against the header, the pins 74a project through the plate into the mold.

Resilient means are provided for normally urging the plate outwardly from the header, and means are provided for limiting this outward movement. In this example, bolts 119 slidably extend through holes in the header 65a and are screwed into the plate 115 at 120. The outer end of each bolt has a head 121 which is spaced from the header when the plate bears against the latter. A spring 123 is positioned on each bolt 119 between the header and the plate. It is desirable to provide a recess 124 for accommodating each spring when the plate is pressed against the header.

When the header 65a is moved downwardly into the mold 36, the plate 115 thereof first comes into contact with the concrete in the mold. As the header continues to move downwardly, the springs 123 are compressed until the header engages the plate and presses it against the concrete. The pins 74a enter the concrete at this time, see Figure 6. When the header is moved away from the concrete, the expansion of the springs 123 retains the plate 115 against the concrete while the pins 74a are being withdrawn therefrom. As soon as the pins are clear of the concrete, as shown in Figure 7, the header engages the heads 121 of the bolts and draws the plates with it away from the concrete and out of the mold.

If it is desired to form depressions 110 in the upper edges of the blocks, each plate 115 is provided with protuberances 128 which are of the desired shape and size, there being one of these protuberances at each hole 116 of the plate through which a pin 74a projects.

What I claim as my invention is:

1. Apparatus for making blocks from plastic material, such as concrete, having at least one hole in each of opposite edges thereof, comprising a table, a pallet board element having at least one hole extending therethrough, there being a hole in the board element for each hole required in the block, said board element having a notch in a side edge thereof, a stop at one side of the table, a resiliently loaded roller spaced from the stop, conveying means for directing the board element on to the table between the stop and roller, electrical means for operating the conveying means, said roller being moved into the notch of the board element when the latter is in a predetermined position, switch means operated by the roller when it is in the board element notch to stop the conveyor operating means, a mold element spaced above the table a distance greater than the height of the block, said mold element being open at its top and bottom, means for bringing the table and mold element together with the bottom of the latter bearing against the board element and separating said table and mold element again, a lower pin aligned with each board element hole, means for moving each pin through the table into and out of the mold element through a board element hole, means for directing plastic material into the top of the mold element when it is bearing against the board element, a header above the mold element adapted slidably to fit into the latter, an upper pin on the header in line with and projecting towards each lower pin, and means for moving the header into and out of the mold element to press each pin thereon into the material in the mold element as it presses said material to form the block, each lower pin being in the mold element when the material is pressed by the header and said mold element and table being separated leaving the block on the board element by means of which it may be transported from the machine without disturbance.

2. Apparatus for making blocks from plastic material, such as concrete, having at least one hole in an edge thereof, comprising a stationary mold open at its top and bottom, a support normally spaced below the mold a distance greater than the height of the block to be formed, a table resiliently mounted on the support, a pallet board removably mounted on the table and having at least one hole extending therethrough, there being one hole in the board for each hole required in the block, means connected to the support for moving the latter and the table towards the mold to press the pallet board against the bottom thereof and moving the support and table back to their normal position, a bracket spaced beneath the table and carried thereby, a header plate between the bracket and table, a pin projecting upwardly from the header plate for and aligned with each board hole, at least one solenoid mounted on the bracket and having an upwardly-projecting core connected to the header plate for moving each pin through the table into and out of the mold through a board hole, means for directing plastic material into the top of the mold when it is bearing against the board, a header above the mold adapted slidably to fit into the latter, means for moving the header into and out of said mold to press the material therein to form the block, each pin being in the mold when the material is pressed by the header, and means for causing the header and the table to move downwardly simultaneously with the formed block between the former and the pallet board, said header being raised to leave the block on the board by means of which it may be transported from the machine without disturbance.

3. Apparatus for making blocks from plastic material, such as concrete, having at least one hole in each of opposite edges thereof, comprising a stationary mold open at its top and bottom, a support normally spaced below the mold a distance greater than the height of the block to be formed, a table resiliently mounted on the support, a pallet board removably mounted on the table and having at least one hole extending therethrough, there being one hole in the board for each hole required in the block, means connected to the support for moving the latter and the table towards the mold to press the pallet board against the bottom thereof and moving the support and table back to their normal position, a bracket spaced beneath the table and carried thereby, a header plate between the bracket and table, a lower pin projecting upwardly from the header plate for and aligned with each board hole, at least one solenoid mounted on the bracket and having an upwardly-projecting core connected to the header plate for moving each pin through the table into and out of the mold through a board hole, means for directing plastic material into the top of the mold when it is bearing against the pallet board, a header above the mold adapted slidably to fit into the latter, an upper pin on the header in line with and projecting towards each lower pin, means for moving the header into and out of the mold to press each upper pin into the material in the mold as it presses said material to form a block, each lower pin being in the mold when the material is pressed by the header, and means for causing the header and the table to move downwardly simultaneously with the formed block between the former and the pallet board, said header being raised to leave the block on the board by means of which it may be transported from the machine without disturbance.

4. Apparatus for making blocks from plastic material, such as concrete, having at least one hole in an edge thereof, comprising a mold open at its top and bottom, vertical rods connected to and supporting the mold, eccentric cams engaging the lower ends of the rods, means connected to the cams for rotating them to vibrate the mold through the rods, a support normally spaced below the mold a distance greater than the height of the block to be formed, a table resiliently mounted on the support, a pallet board removably mounted on the table and having at least one hole extending therethrough, there being one hole in the board for each hole required in the block, means connected to the support for moving the latter and the table towards the mold to press the pallet board against the bottom thereof and moving the support and table back to their normal position, a bracket spaced beneath the table and carried thereby, a header plate between the bracket and table, a pin projecting upwardly from the header plate for and aligned with each board hole, at least one solenoid mounted on the bracket and having an upwardly-projecting core connected to the header plate for moving each pin through the table into and out of the mold through a board hole, means for directing plastic material into the top of the mold when it is bearing against the board, a header above the mold adapted slidably to fit into the latter, means for moving the header into and out of said mold to press the material therein to form the block, each pin being in the mold when the material is pressed by the header, and means for causing the header and the table to move downwardly simultaneously with the formed block between the former and the pallet board, said header being raised to leave the block on the board by means of which it may be transported from the machine without disturbance.

5. Apparatus for making blocks from plastic material, such as concrete, having at least one hole in each of the opposite edges thereof, comprising a mold open at its top and bottom, vertical rods connected to and supporting the mold, eccentric cams engaging the lower ends of the rods, means connected to the cams for rotating them to vibrate the mold through the rods, a support normally spaced below the mold a distance greater than the height of the block to be formed, a table resiliently mounted on the support, a pallet board removably mounted on the table and having at least one hole extending therethrough, there being one hole in the board for each hole required in the block, means connected to the support for moving the latter and the table towards the mold to press the pallet board against the bottom thereof and moving the support and table back to their normal position, a bracket spaced beneath the table and carried thereby, a header plate between the bracket and table, a lower pin projecting upwardly from the header plate for and aligned with each board hole, at least one solenoid mounted on the bracket and having an upwardly-projecting core connected to the header plate for moving each pin through the table into and out of the mold through a board hole, means for directing plastic material into the top of the mold when it is bearing against the pallet board, a header above the mold adapted slidably to fit into the latter, an upper pin on the header in line with and projecting towards each lower pin, means for moving the header into and out of the mold to press each upper pin into the material in the mold as it presses said material to form a block, each lower pin being in the mold when the material is pressed by the header, and means for causing the header and the table to move downwardly simultaneously with the formed block between the former and the pallet board, said header being raised to leave the block on the board by means of which it may be transported from the machine without disturbance.

6. Apparatus for making blocks from plastic material, such as concrete, having at least one hole in each of opposite edges thereof, comprising a stationary mold open at its top and bottom, a support normally spaced below the mold a distance greater than the height of the block to be formed, a table resiliently mounted on the support, a pallet board removably mounted on the table and having at least one hole extending therethrough, there being one hole in the board for each hole required in the block, means connected to the support for moving the latter and the table towards the mold to press the pallet board against the bottom thereof and moving the support and table back to their normal position, a lower pin beneath and carried by the table aligned with each board hole, each pin being movable through the table, means for moving each pin through the table into and out of the mold through a board hole, means for directing a plastic material into the top of the mold when it is bearing against the pallet board, a header above the mold adapted slidably to fit into the latter, an upper pin on the header in line with and projecting towards each lower pin, a plate adapted to fit in the mold beneath the header and having a hole therethrough for each upper pin through which the latter projects, resilient means urging the plate outwardly away from the header, means limiting the outward movement of the plate, means for moving the header into and out of the mold to press each upper pin into the material in the mold as it presses the plate against said material to form a block, each lower pin being in the mold when the material is pressed by the header, and means for causing the header and the table to move downwardly simultaneously with the formed block between the former and the pallet board, said header being raised to leave the block on the board by means of which it may be transported from the machine without disturbance, and said resilient means when the header is raised retaining the plate against the block material while each upper pin is withdrawn therefrom and the limiting means drawing the plate away from the material with the header after this has taken place.

(References on following page)

References Cited in the file of this patent

UNITED STATES PATENTS

| | | |
|---|---|---|
| 350,048 | Du Pont | Sept. 8, 1886 |
| 442,599 | Beam | Dec. 16, 1890 |
| 487,161 | Ross et al. | Nov. 29, 1892 |
| 764,623 | Palmer | July 12, 1904 |
| 777,086 | Emery | Dec. 13, 1904 |
| 784,154 | Gutteridge et al. | Mar. 7, 1905 |
| 1,396,779 | Post et al. | Nov. 15, 1921 |
| 1,471,608 | Irwin et al. | Oct. 23, 1923 |
| 1,921,003 | Romie | Aug. 8, 1933 |
| 2,228,246 | Bergan | Jan. 14, 1941 |
| 2,303,884 | Krehbiel et al. | Dec. 1, 1942 |
| 2,589,115 | Nelson et al. | Mar. 11, 1952 |
| 2,651,827 | Oswalt | Sept. 15, 1953 |
| 2,667,679 | Jackman | Dec. 2, 1954 |
| 2,670,516 | McEachran | Mar. 2, 1954 |

FOREIGN PATENTS

| | | |
|---|---|---|
| 29,270 | Switzerland | Aug. 19, 1903 |
| 980,270 | France | Dec. 27, 1950 |